(12) United States Patent
Faulkner et al.

(10) Patent No.: US 9,323,305 B2
(45) Date of Patent: Apr. 26, 2016

(54) POWER SUPPLY UNIT WITH CONFIGURABLE OUTPUT RAILS

(71) Applicant: Dell Products, LP, Round Rock, TX (US)

(72) Inventors: Michael A. Faulkner, Westborough, MA (US); Jason D. Adrian, Cedar Park, TX (US); Kevin W. Mundt, Austin, TX (US)

(73) Assignee: Dell Products, LP, Round Rock, TX (US)

(*) Notice: Subject to any disclaimer, the term of this patent is extended or adjusted under 35 U.S.C. 154(b) by 494 days.

(21) Appl. No.: 13/731,767

(22) Filed: Dec. 31, 2012

(65) Prior Publication Data

US 2014/0189379 A1    Jul. 3, 2014

(51) Int. Cl.
*G06F 1/00* (2006.01)
*G06F 1/32* (2006.01)
*G06F 1/30* (2006.01)
*G06F 11/20* (2006.01)
*G06F 1/26* (2006.01)

(52) U.S. Cl.
CPC *G06F 1/30* (2013.01); *G06F 1/263* (2013.01); *G06F 11/2015* (2013.01); *G06F 1/26* (2013.01); *G06F 2217/78* (2013.01)

(58) Field of Classification Search
CPC ............................... G06F 1/26; G06F 2217/78
USPC ................................... 713/300, 320, 323, 330
See application file for complete search history.

(56) References Cited

U.S. PATENT DOCUMENTS

| | | |
|---|---|---|
| 6,040,981 A | 3/2000 | Schmitt et al. |
| 2004/0160741 A1 | 8/2004 | Moss et al. |
| 2007/0120543 A1* | 5/2007 | Caldwell ............... 323/272 |
| 2007/0121277 A1* | 5/2007 | Lanus et al. ........... 361/600 |
| 2008/0278905 A1 | 11/2008 | Artman et al. |
| 2009/0059513 A1 | 3/2009 | Hood, III et al. |
| 2009/0265045 A1 | 10/2009 | Coxe, III |
| 2010/0097019 A1 | 4/2010 | Artman et al. |
| 2011/0012547 A1 | 1/2011 | Sultenfuss et al. |
| 2011/0239025 A1 | 9/2011 | Artman et al. |

\* cited by examiner

*Primary Examiner* — Michael J Brown
(74) *Attorney, Agent, or Firm* — Larson Newman, LLP

(57) ABSTRACT

A power supply unit includes two or more power converters. Each power converter provides power at a corresponding output terminal of the power supply unit. The power supply unit also includes a controller to determine an operating mode of the power supply unit. When the power supply unit is operating in one mode, the controller disables transmission of power at one output terminal in response to detecting a fault associated with another output terminal.

17 Claims, 3 Drawing Sheets

POWER SUPPLY UNIT WITH CONFIGURABLE OUTPUT RAILS

FIELD OF THE DISCLOSURE

This disclosure generally relates to information handling systems, and more particularly relates to power supply units with configurable output rails.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, networking systems, and data storage systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements.

Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Figure 1:
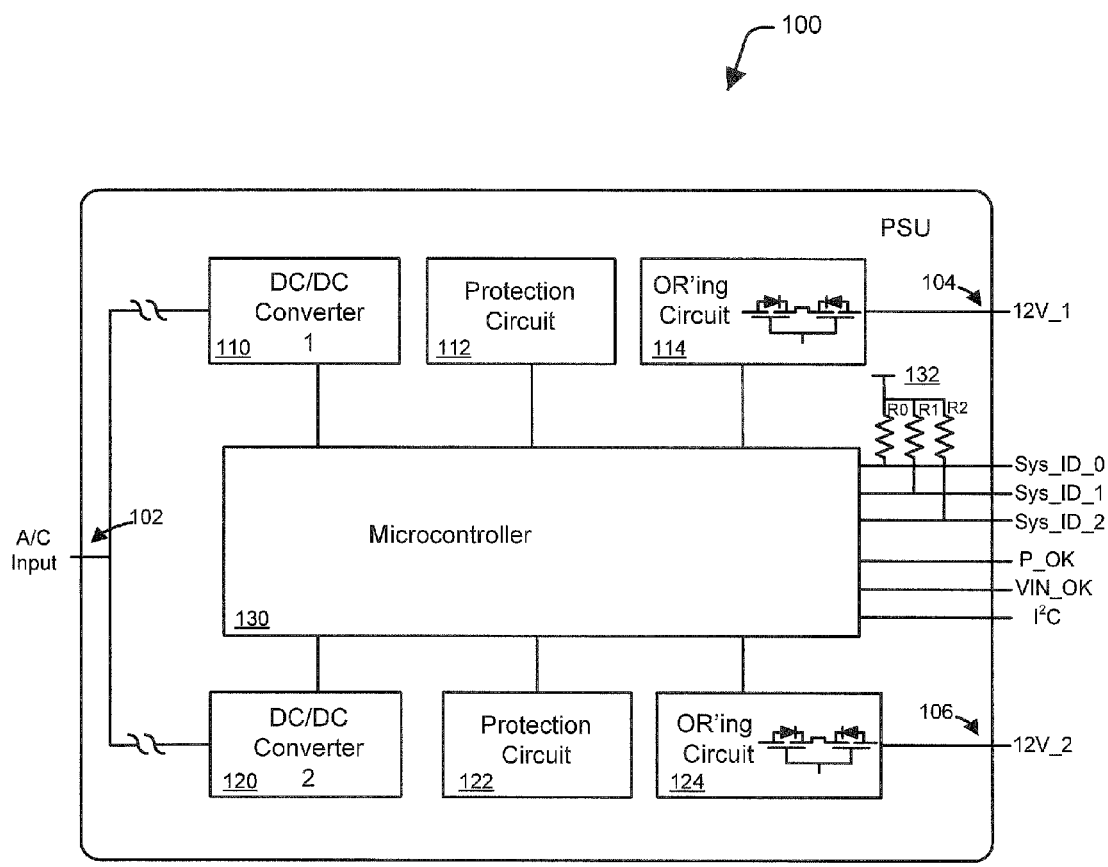
FIG. 1 is a block diagram illustrating a power supply unit according to a specific embodiment of the present disclosure.
Figure 2:
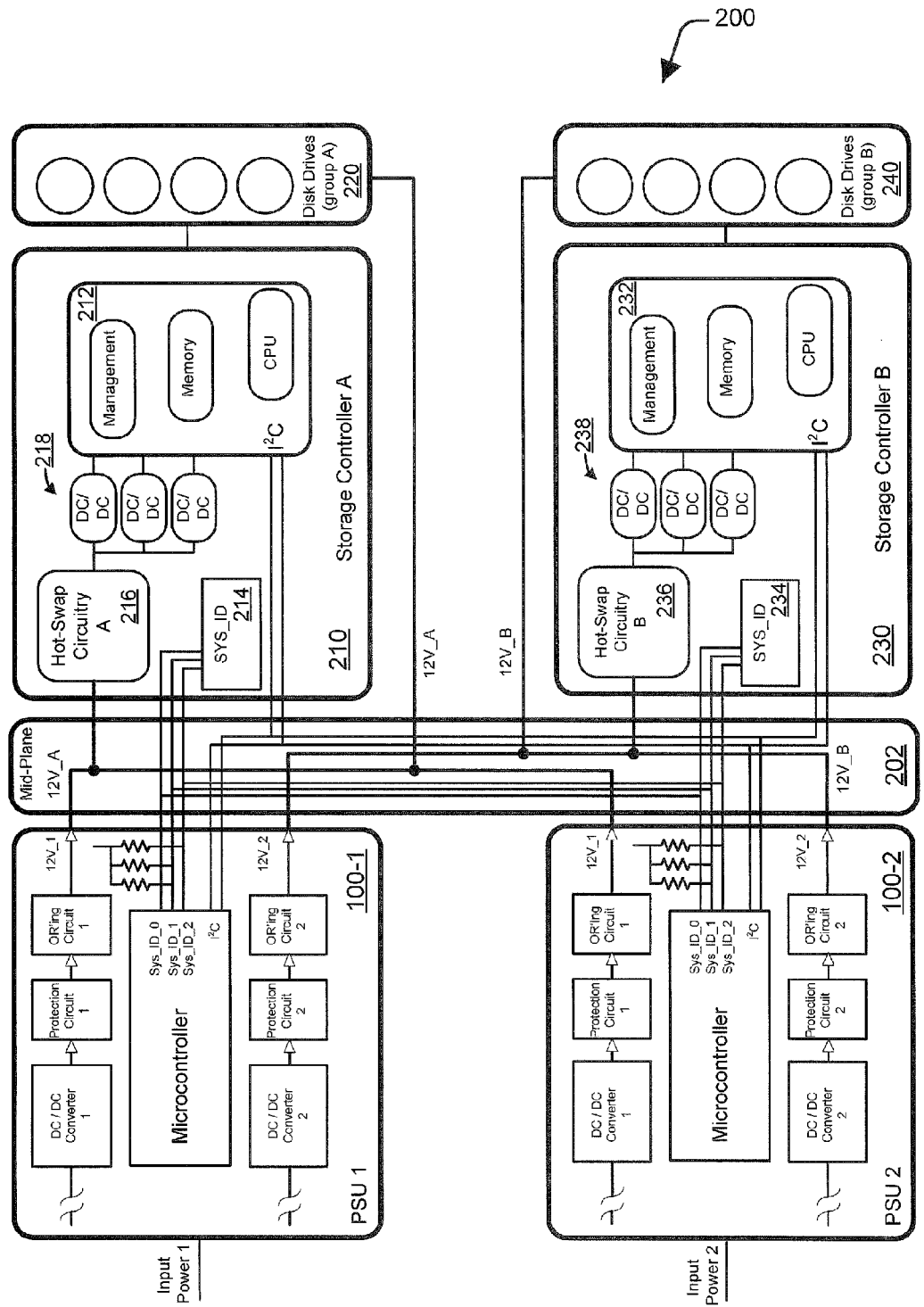
FIG. 2 is a block diagram illustrating a data storage system according to a specific embodiment of the present disclosure.
Figure 3:
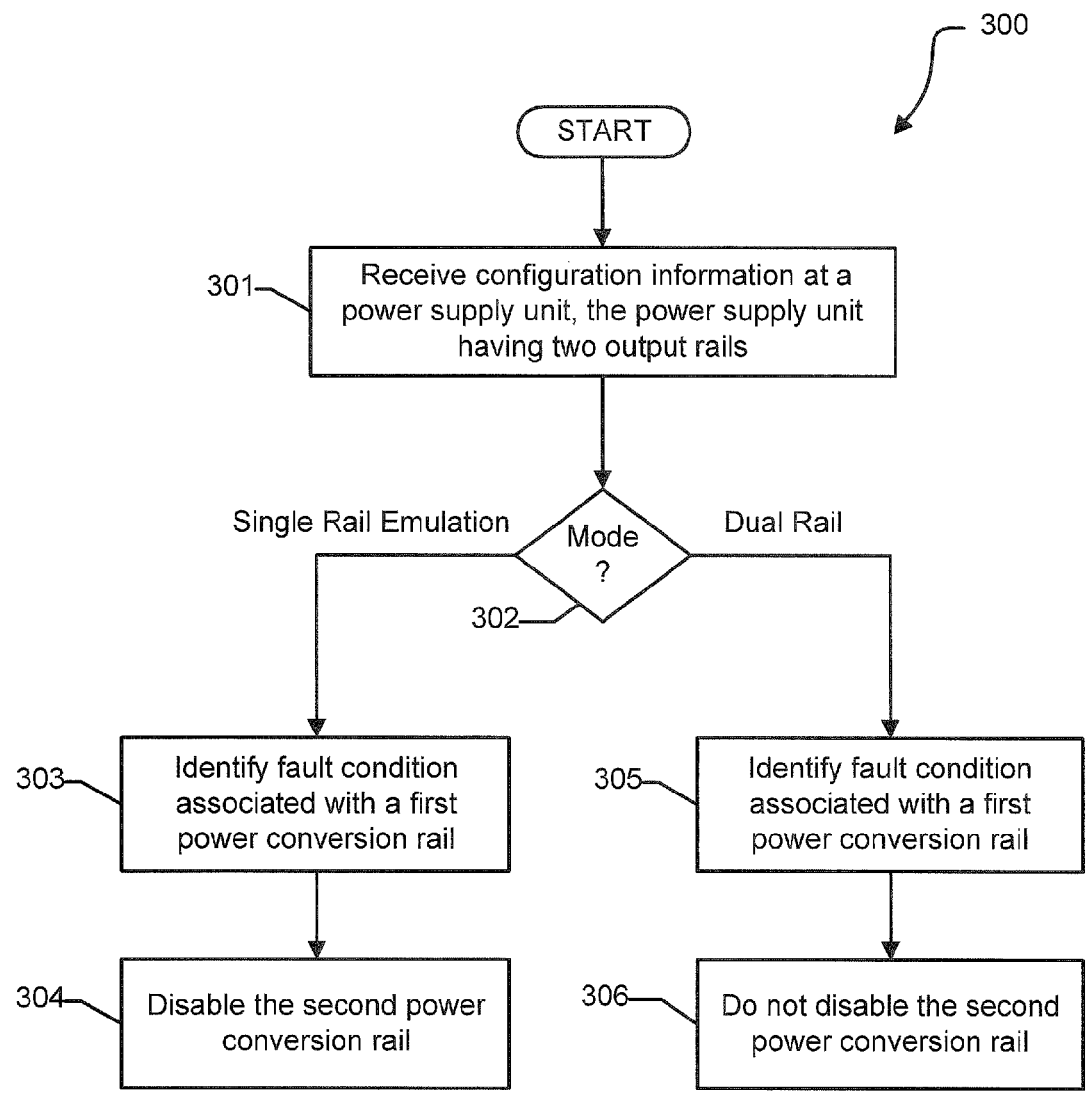
FIG. 3 is a flow diagram illustrating a method according to a specific embodiment of the present disclosure.

FIGS. 1-3 show an apparatus, a system, and a method for providing power to components of an information handling system. Techniques disclosed herein are described with reference to a data storage system; however the techniques are equally applicable to providing power to other devices, and to other types of information handling systems and system components.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

A data storage system can include one or many data storage devices, such as hard disk drives, solid state drives, optical drives, and the like. A data storage system generally includes one or more data storage controllers, and one or more power supply units. A high-capacity data storage system can include a large number of storage devices, multiple storage controllers, and multiple power supply units. These components are often installed in a chassis, such as an equipment rack. An equipment rack provides a space-efficient enclosure and provides easy access to the components to facilitate replacement and maintenance. A power supply unit typically provides low-voltage direct current to devices installed within the server rack.

A data storage controller is configured to receive data-read and data-write requests from one or more data processors, the requests directing the data storage system to retrieve or store information at one or more data storage devices. The data storage controller can include a compute engine or similar microprocessor-based computation device that is responsible for servicing access requests and can be responsible for implementing failover procedures if a fault is detected in the data storage system. In addition, a data storage system can be configured to provide redundancy so that a failure of one component does not result in a loss of stored data. For example, data maintained at a data storage system can be replicated on two or more data storage devices, each device accessible by a respective, and redundant, storage controller. Power can be provided to the storage devices and controllers using redundant power supply units so that a failure of a power supply unit does not result in a loss or inaccessibility of stored data. Redundancy and data integrity protocols implemented by data storage controllers can depend on specific behavior of power supply units, such as how the power supply unit responds to a fault.

A power supply unit can include multiple output terminals, and each terminal can receive power from a corresponding power conversion circuit included at the power supply unit. A power conversion circuit may be referred to as a voltage regulator, and herein is referred to as a power conversion rail, a power rail, or simply a rail. A power supply unit can include one or more rails. For example, a power supply unit can include two twelve volt rails, each rail providing a direct current at a voltage of twelve volts, or another voltage, to a corresponding output terminal. Alternatively, a power supply may include a single twelve volt rail, or another number of rails. A data storage system may require use of a power supply unit having a particular rail configuration. As used herein, a power conversion circuit can include a DC-to-DC converter, an AC-to-DC converter, or a DC-to-AC converter. In addition, the power conversion circuit can utilize switching, linear, or another conversion/regulation technology.

A power supply unit disclosed herein can be configured to operate in one of two operating modes based on the needs of the devices receiving power from the unit. In one operating mode, the power supply unit is configured to disable the sourcing of power at one output terminal if a fault is detected at a second terminal, or in response to a request to disable the second terminal. In other words, two output terminals are configured to operate in unison. Alternatively, the power supply unit can be configured so that each power output terminal operates independently. For example, when the power supply unit is configured to operate in a second mode, a fault associated with one output terminal does not result in the disabling of the second terminal. Similarly, a request to shut down the first tetminal does not result in deactivation of the second terminal. Therefore, the power supply unit disclosed herein can adapt its mode of operation to conform to unique requirements of different data storage controllers and system. In an embodiment, a data storage controller provides configuration information to one or more power supply units, the information specifying a desired operating mode 2.

FIG. 1 shows a power supply unit 100 according to a specific embodiment of the present disclosure. The power supply unit 100 includes two power converters, DC/DC converter 110 and DC/DC converter 120. Therefore the power supply unit 100 can be referred to as a dual-rail power supply. The power supply unit 100 can include additional power conversion circuits (not shown at FIG. 1). The power supply unit 100 is configured to receive power at an input terminal 102 and to provide regulated power at output terminals 104 and 106. For example, the DC/DC converter 110 is configured to provide a reference voltage 12V_1 at the output terminal 104, and the DC/DC converter 120 is configured to provide a reference voltage 12V_2 at the output terminal 106. Power received at the input terminal 102 can include mains power, such as 120VAC, but can include alternating or direct current at other voltage levels. Each power converter is associated with a protection circuit and an OR'ing circuit. For example, the DC/DC converter 110 is associated with a protection circuit 112 and an OR'ing circuit 114, and the DC/DC converter 120 is associated with a protection circuit 122 and an OR'ing circuit 124.

The power supply unit 100 includes a microcontroller 130 for monitoring and controlling various operating conditions of the power supply unit 100. The microcontroller can receive commands and transmit information using one or more communication interfaces, such as a General Purpose Input/Output (GPIO) ports, an I²C compliant serial interface, and the like. In particular, the power supply unit 100 includes an I²C interface and a three-pin System Identification interface (Sys_ID_0, Sys_ID_1, and Sys_ID_2). In an embodiment of the present disclosure an external device, such as a storage controller, can configure the power supply unit to operate in one of the two operating modes described above using one or both of the I²C or Sys_ID interfaces. The power supply unit can include pull-up resistors 132 at the Sys_ID(2:0) inputs. An external device can pull a corresponding one or more of the inputs to a logic-high or to a logic-low level to configure operation of the power supply unit 100. For example, a storage controller can assert a logic value of "101" at the Sys_ID (2:0) interface to configure the power supply unit 100 to emulate a single-rail unit, or can assert a logic value of "010" at the Sys_ID(2:0) interface to configure the power supply unit 100 to operate as a two rail unit. Multiple inputs are used to codify the desired operating mode to provide a level of redundancy so that the correct operating mode is established even in the event that one of the three inputs becomes non-functional, such as due to a bent pin.

The power supply unit 100 and microcontroller 130 can include an output terminal P_OK and an output terminal VIN_OK. The power supply unit 100 can assert a signal at the output terminal P_OK to indicate that power is presently being provided at the output terminals 104 and 106 by the power supply unit 100. Similarly, the power supply unit 100 can assert a signal at the output terminal VIN_OK to indicate that power is presently being received at the input terminal 102. The power supply unit can include other inputs and outputs without departing from the present disclosure.

A protection circuit 112 is configured to monitor operating parameters associated with the output terminal 104 and to disable the DC/DC converter 110 if the operating parameters fall outside specified levels. For example, the protection circuit 112 can monitor a current level and a voltage level at the output terminal 104 to determine whether the current and voltage levels are consistent with operational specifications of the power supply unit 100. The protection circuit 112 can monitor other operating characteristics, such as the temperature of components included at the supply 100, a voltage level at the input terminal 102, and the like. If the protection circuit 112 determines that an operating characteristic exceeds specified tolerances, the protection circuit can disable the DC/DC converter 110 or otherwise disable providing power at the output 104. The power supply unit 100 can notify external systems of the disruption by de-asserting a signal at the output terminal P_OK.

The OR'ing circuit 114 is configured to prevent current from flowing back into the supply 100. For example, the output terminal 104 can be connected to another output terminal of the supply 100 or to an output terminal of another power supply unit to provide redundancy in the event that one of the outputs experiences a fault or is otherwise disabled. The OR'ing circuit 114 can include a metal oxide semiconductor field effect transistor (MOSFET), another type of electronic switching device, a diode, or other devices that facilitate connecting the output terminal 104 to another output terminal. The power supply unit 100 can include other components not shown at FIG. 1, such as one or more power factor control circuits, bulk capacitors, and the like.

FIG. 2 shows a data storage system 200 according to a specific embodiment of the present disclosure. The data storage system 200 is configured to prevent permanent loss of data in the event of a single point of failure. The data storage system includes redundant disk storage devices, data storage controllers, and power supplies. In particular, the data storage system 200 includes power supply unit 100-1, a mid-plane 202, a storage controller 210, disk drives 220, power supply unit 100-2, storage controller 230, and disk drives 240. The power supply units 100-1 and 100-2 can represent the power supply unit 100 of FIG. 1. In an embodiment, the storage controllers provide information to the power supply units, the information specifying a desired mode of operation of the power supply units. For example, the storage controller 210 can configure the power supply units 100-1 and 100-2 to operate in a single-rail emulation mode where a power supply unit is configured to disable a second power rail in response to detecting a fault at a first power rail. Alternatively, the storage controller can configure the power supply units 100-1 and 100-2 so that each power rail at each power supply unit operates independently.

The data storage system 200 exhibits a level of fault tolerance based not only on the use of redundant power supply units, storage controllers, and disk drives, but also as a result of fault handling protocols implemented in hardware and software at the storage controllers. For example, the storage controllers can replicate information stored at the disk drives 220 at the disk drives 240. Accordingly, a fault/failure at one power supply unit, at one power distribution bus, or at one disk controller does not prevent the system from performing its data storage function. Furthermore, the fault handling protocols are based on an understanding of how other system components operate in response to each of many fault mechanisms. For example, remedial actions initiated by a storage controller in the event of a power failure at one power bus can depend on the behavior of the power supply units, such as whether power rails at a power supply unit operate independently or in unison. Thus, a data storage system can utilize a common chassis, a single type of power supply unit, and a common mid-plane, and yet support different types of storage controllers having different operating requirements as they relate to operation of the power supply units.

The data storage system 200 is further configured to support component replacement while the system is operational, referred to as hot-swapping. Hot-swapping is facilitated by circuitry dedicated to such purpose, and by design aspects of an enclosure in which the components are installed. For example, a system rack can include a mid-plane/bulkhead assembly at the interior of the chassis, such as the mid-plane 202 at the data storage system 200. The mid-plane can include a printed circuit board and includes electrical connectors/receptacles for interfacing to corresponding connectors included at each power supply unit, storage controller, and disk drive. The mid-plane includes wiring or printed circuit traces for communicating power received from power supply units to one or more storage controllers and/or disk drives.

A data storage controller, such as storage controllers 210, can include a compute engine 212 that is configured to receive data access commands over a data communication interface (not shown at FIG. 3), and can retrieve or store information at one or more disk drives as directed by the access commands. For, example, the storage controller 210 can access each of the disk drives 220. The compute engine can include an I²C interface for communicating with other devices. For example, the controller 210 can communicate with power supply units 100-1 and 100-2. In an embodiment, the controller 210 can transmit commands over the I²C interface to configure each of power supply units 100-1 and 100-2 to operate in a desired operating model, as described above. In another embodiment, the controller 210 can configure the desired operating mode of each of the power supply units 100-1 and 100-2 by applying a predetermined encoding on the Sys_ID(2:0) interface bus or similar GPIO bus. One skilled in the art will appreciate that another serial or parallel communication mechanism can be used to transmit configuration information to the power supply units. For example, a GPIO interface can include a fewer or a greater number of signal lines.

The data storage controller 210 can include power conversion circuits 218 for providing operating power to the compute engine 212. The circuits 218 receive power from the mid-plane, through hot-swap circuitry 216. The hot-swap circuitry 216 allows the insertion and removal of the controller 210 while power provided at the bulkhead is still enabled. The hot-swap circuitry 216 typically includes a MOSFET switch that is configured to prevent excessive current flow by transitioning gracefully from a high impedance state to a lower-impedance state when the controller 216 is inserted into the mid-plane. The hot-swap circuitry 216 can function to prevent connection to the system bus voltage until the bus voltage reaches a minimum acceptable threshold, referred to as under voltage lockout. In addition, the hot-swap circuitry 216 can provide over-voltage protection, by disabling if the bus voltage exceeds a maximum allowable threshold. Each disk drive of disk drives 220 and 240 also can include hot-swap circuitry to facilitate installation and removal of drives at the mid-plane.

The mid-plane 202 includes one power distribution bus labeled 12V_A and another power distribution bus labeled 12V_B. The bus 12V_A receives power from the output terminal 104 of the power supply unit 100-1 and from the output terminal 104 of the power supply unit 100-2. Similarly, the bus 12V_B receives power from the output terminal 106 of the power supply unit 100-1 and from the output terminal 106 of the power supply unit 100-2. The storage controller 210 and the disk drives 220 receive power from the power bus 12V_A, and the storage controller 230 and the disk drives 240 receive power from the power bus 12V_B. Consequently, a fault at the power supply unit 100-1 or at the power bus 12V_A can result in the inoperability of the storage controller 210 and the disk drives 220, but the storage controller 230 and the disk drives 240, which receive power from the power bus 12V_B, can remain operational. Once the fault has been corrected, such as by replacing a failed power supply unit 100-1 with a replacement unit, the storage controller 230 can re-synchronize data stored at the disk drives 220 with data stored at the disk drives 240.

While the mid-plane 202 depicts two 12-volt power busses, the mid-plane can include power distribution busses providing power at one or more other voltage levels determined by the operational requirements of the storage controllers 210 and 230, requirements of the disk drives 220 and 240, and requirements of other devices installed at the data storage system 200. For example, the power supply units 100-1 and 100-2 may additionally provide power at a 5-volt level. Furthermore, the data storage system 200 includes only two power supply units and two storage controllers; however a greater number of power supplies and controllers can be included at the data storage system 200. In addition, power rails from more than two power supply units can be connected to one power distribution bus.

FIG. 3 shows a method 300 of providing power at a power supply unit according to a specific embodiment of the present disclosure. The method 300 begins at block 301 where configuration information is received at a power supply unit, the power supply unit having two power rails. For example, the power supply unit 100 of FIG. 1 includes two power converters to provide power at two corresponding output terminals. The power supply unit 100 can determine a mode of operation based on the configuration information. In one mode, the two power rails are configured to operate in unison (referred to herein as single-rail emulation), while in another mode the two power rails are configured to operate independently (referred to herein as dual-rail). The flow proceeds to a decision block 302 where the power supply unit determines a mode of operation based on the configuration information, proceeding to block 303 if the power supply unit is configured to operate in a single-rail emulation mode, and proceeding to block 305 if the power supply unit is configured to operate in a dual-rail mode.

If the power supply is configured to operate in a single-rail mode, the flow proceeds to block 303. At the block 303, the power supply unit determines that there is a fault associated with a first power conversion rail. In response, the first power conversion rail is disabled. For example, the protection circuit 112 at the power supply unit 100 can detect that excessive current is being consumed at the output terminal 104, such as what may occur if a conductor for carrying output voltage 12V_1 is shorted to ground. In response to detecting the fault, the protection circuit 112 disables the first power conversion rail. The flow proceeds to block 304 where the power supply unit disables the second power conversion rail. Similarly, if the power supply unit 100 detects a fault associated with the second power conversion rail, the power supply unit responds by disabling the first power conversion rail.

Returning to the decision block 302, if the power supply is configured to operate in a dual-rail mode, the flow proceeds to block 305. At the block 305, the power supply unit determines that there is a fault associated with the first power conversion rail. In response, the first power conversion rail is disabled. The flow proceeds to block 306 where the power supply unit maintains operation of the second power conversion rail. Similarly, if the power supply unit 100 detects a fault associated with the second power conversion rail, the power supply unit responds by maintaining operation of the first power conversion rail. Therefore, a single power supply unit having multiple power conversion circuits can be configured to operate similar to a single-rail power supply or a multiple-rail power supply.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A power supply unit comprising:
an input terminal for receiving input power;
a first power converter coupled to a first output terminal;
a second power converter coupled to a second output terminal; and
a controller to determine a mode of operation, the controller to:
disable transmission of power at the first output terminal in response to detecting a fault associated with the second output terminal when operating in a first mode; and
maintain transmission of power at the first output terminal in response to detecting a fault associated with the second output terminal when operating in a second mode.

2. The power supply unit of claim 1, wherein the controller is further to:
disable transmission of power at the first output terminal in response to receiving a command to disable transmission of power at the second output terminal when operating in the first mode; and
maintain transmission of power at the first output terminal in response to receiving a command to disable transmission of power at the second output terminal when operating in a second mode.

3. The power supply unit of claim 1, wherein the power supply unit further comprises a control input, and wherein determining a mode of operation comprises determining the mode of operation in response to configuration information received at the control input.

4. The power supply unit of claim 3, wherein the control input comprises a serial communication interface.

5. The power supply unit of claim 3, wherein the configuration information comprises a fixed reference voltage.

6. The power supply unit of claim 1, wherein the power supply unit further comprises a control input, and wherein determining a mode of operation comprises determining the mode of operation in response to information received at the control input from a data storage controller.

7. The power supply unit of claim 1, wherein detecting a fault associated with the second output terminal comprises detecting an electric current provided at the second output terminal, the electric current in excess of a predetermined value.

8. The power supply unit of claim 1, wherein detecting a fault associated with the second output terminal comprises determining that a voltage provided at the second output terminal is outside a predetermined voltage range.

9. The power supply unit of claim 1, wherein detecting a fault associated with the second output terminal comprises determining power received at the second power converter is disrupted.

10. A method comprising:
receiving configuration information at a power supply unit, the power supply unit comprising a first power converter coupled to a first output terminal and a second power converter coupled to a second output terminal;
determining an operating mode of the power supply unit based on the configuration information;
identifying a fault associated with the second output terminal;
disabling transmission of power at the first output terminal in response to identifying the fault and in response to determining that the operating mode is a first mode; and
maintaining transmission of power at the first output terminal in response to identifying the fault and in response to determining that the operating mode is a second mode.

11. The method of claim 10, further comprising:
disabling transmission of power at the first output terminal in response to receiving a command to disable transmission of power at the second output terminal when operating in the first mode; and
maintaining transmission of power at the first output terminal in response to receiving a command to disable transmission of power at the second output terminal when operating in a second mode.

12. The method of claim 10, wherein the power supply unit further comprises a control input, and wherein determining a mode of operation comprises determining the mode of operation in response to information received at the control input.

13. The method of claim 10, wherein the configuration information is received at a serial communication interface of the power supply unit.

14. The method of claim 10, wherein the configuration information is received from a data storage controller.

15. The method of claim 10, wherein the configuration information comprises a fixed reference voltage.

16. A data storage system comprising:
a data storage controller;
a data storage device coupled to the data storage controller; and
a power supply unit to provide power to the data storage controller and to the data storage device, the power supply unit comprising:
an input terminal for receiving input power;
a first power converter coupled to a first output terminal;
a second power converter coupled to a second output terminal; and
a controller to determine a mode of operation, the controller to:
disable transmission of power at the first output terminal in response to detecting a fault associated with the second output terminal when operating in a first mode; and
maintain transmission of power at the first output terminal in response to detecting a fault associated with the second output terminal when operating in a second mode.

17. The data storage system of claim 16, wherein determining a mode of operation comprises determining the mode of operation based on information received from the data storage controller.

* * * * *